(12) United States Patent
Dylla (10) Patent No.: US 12,280,872 B2
(45) Date of Patent: Apr. 22, 2025

(54) WINGED STORE MECHANICAL CAPTURE INTERFACE FOR USE WITH AN AIRCRAFT

(71) Applicant: Raytheon Company, Arlington, VA (US)

(72) Inventor: Joseph P. Dylla, Oro Valley, AZ (US)

(73) Assignee: Raytheon Company, Arlington, VA (US)

( * ) Notice: Subject to any disclaimer, the term of this patent is extended or adjusted under 35 U.S.C. 154(b) by 49 days.

(21) Appl. No.: 18/118,976

(22) Filed: Mar. 8, 2023

(65) Prior Publication Data

US 2024/0300646 A1 Sep. 12, 2024

(51) Int. Cl.
*B64D 1/06* (2006.01)

(52) U.S. Cl.
CPC ..................... *B64D 1/06* (2013.01)

(58) Field of Classification Search
CPC .... B64D 1/04; B64D 1/06; B64D 7/08; F42B 10/42; F42B 10/14
See application file for complete search history.

(56) References Cited

U.S. PATENT DOCUMENTS

| | | | | |
|---|---|---|---|---|
| 2,792,756 | A | * 5/1957 | Schneiter | B64D 1/06 89/1.819 |
| 2,811,900 | A | * 11/1957 | Robert | F41F 3/06 89/1.819 |
| 2,876,677 | A | 3/1959 | Clark et al. | |
| 3,268,188 | A | * 8/1966 | Righter | B64D 1/06 294/82.26 |
| 4,826,105 | A | 5/1989 | Smiley | |
| 4,838,502 | A | * 6/1989 | Pinson | F42B 10/42 244/49 |
| 6,634,599 | B2 | 10/2003 | Griffin | |
| 10,429,159 | B2 | 10/2019 | Dylla et al. | |

(Continued)

FOREIGN PATENT DOCUMENTS

| | | |
|---|---|---|
| WO | WO-2008010226 A1 | 1/2008 |
| WO | WO-2024186462 A1 | 9/2024 |

OTHER PUBLICATIONS

"International Application Serial No. PCT/US2024/016243, International Search Report mailed Jun. 13, 2024", 4 pgs.

(Continued)

*Primary Examiner* — Christopher D Hutchens
(74) *Attorney, Agent, or Firm* — Schwegman Lundberg & Woessner, P.A.

(57) ABSTRACT

A store-side mechanical interface includes attachment features formed in a wing base(s) on opposite sides of a store Cg for securing an expendable aircraft store with fixed or foldable wings to an aircraft in capture carriage and releasing the expendable aircraft store therefrom. The mechanical interface does not add mass, require additional volume or have an aerodynamic drag penalty and can withstand the large forces placed on it during operation of the aircraft. During captive carriage, the attachment features formed in the wing base are revealed for mechanical engagement with a complementary attachment feature on the aircraft. Upon release, the attachment features are either positioned aft of a wing base or covered by movement of a portion of a wing such that the first and second attachment features do not impede air flow over the store.

14 Claims, 11 Drawing Sheets

CAPS OPEN (56) References Cited

U.S. PATENT DOCUMENTS

| | | |
|---|---|---|
| 10,538,331 B2 | 1/2020 | Taylor et al. |
| 11,332,246 B2 | 5/2022 | Keller et al. |
| 2007/0045466 A1* | 3/2007 | Hellis ................. F42B 10/14 244/3.29 |
| 2010/0276534 A1* | 11/2010 | Earle .................. F41F 3/042 244/3.29 |

OTHER PUBLICATIONS

"International Application Serial No. PCT/US2024/016243, Written Opinion mailed Jun. 13, 2024", 9 pgs.

* cited by examiner

FIG. 3B — CAPS OPEN

FIG. 3C — CAPS CLOSED

FIG. 3A — WING ASSEMBLY WITHOUT CAPS

CAPS OPEN

FIG. 4A

CAPS CLOSED

FIG. 4B

FIG. 5C STORE RELEASE

FIG. 5B STORE EJECTION

FIG. 5A CAPTIVE CARRIAGE

WINGS STOWED

FIG. 9A

WINGS DEPLOYED

WINGED STORE MECHANICAL CAPTURE INTERFACE FOR USE WITH AN AIRCRAFT

BACKGROUND

Field

This disclosure relates to expendable aircraft stores (missiles, guided bombs and the like) and, more particularly, to a mechanical capture interface for the expendable aircraft store to facilitate capture and release to and from an aircraft.

Description of the Related Art

Missiles or guided bombs, referred to here throughout as "stores", are typically attached to a carriage system on the underside of an aircraft via complementary mechanical interfaces. The mechanical interfaces must withstand large forces based on the weight of the the expendable winged store and the motion of the aircraft. While the aircraft flies, takes-off, or lands, the aircraft may expose the store to multiple g-forces, which can multiply the amount of stress experienced by the mechanical interface to maintain the attachment of the store to the aircraft.

Figure 1:
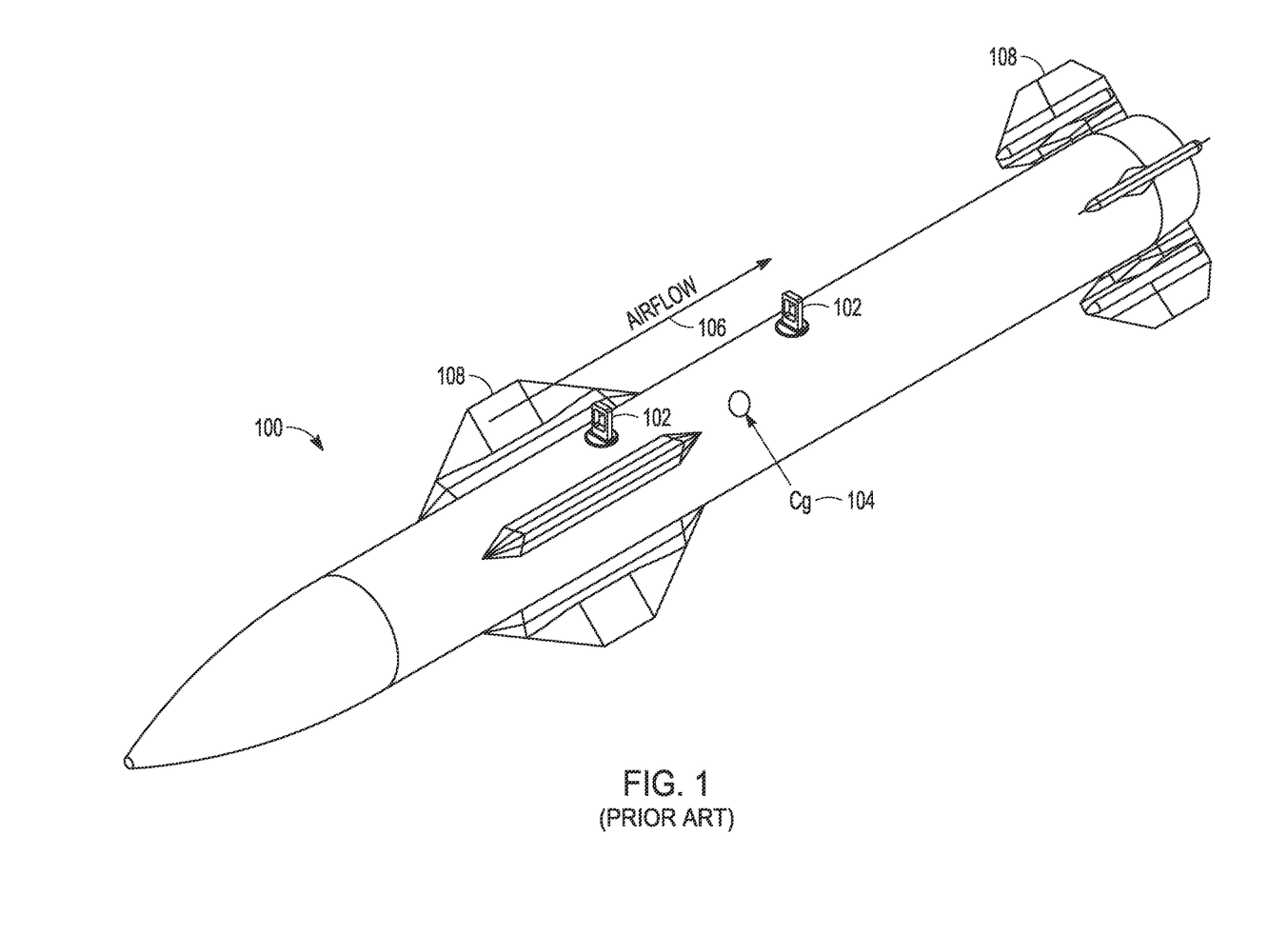
FIG. 1, as described above, is an isometric view of an expendable aircraft store provided with fixed lugs fore and aft of the longitudinal center of gravity of the store.
Figure 2A:
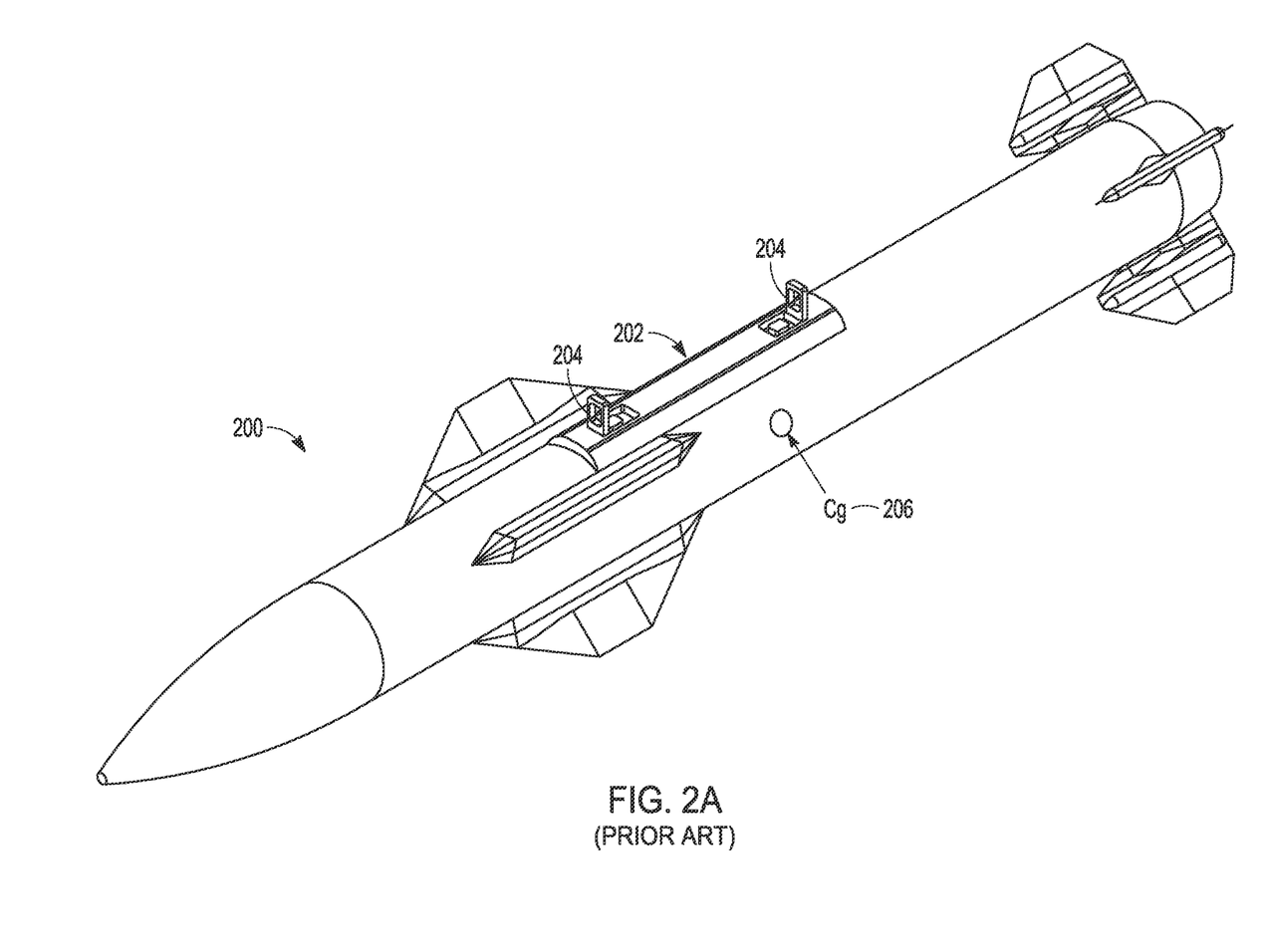
FIGS. 2A and 2B, as described above, are isometric views of an expendable aircraft stored provided with a strongback that supports foldable lugs fore and aft of the longitudinal center of gravity of the store.
Figure 2B:
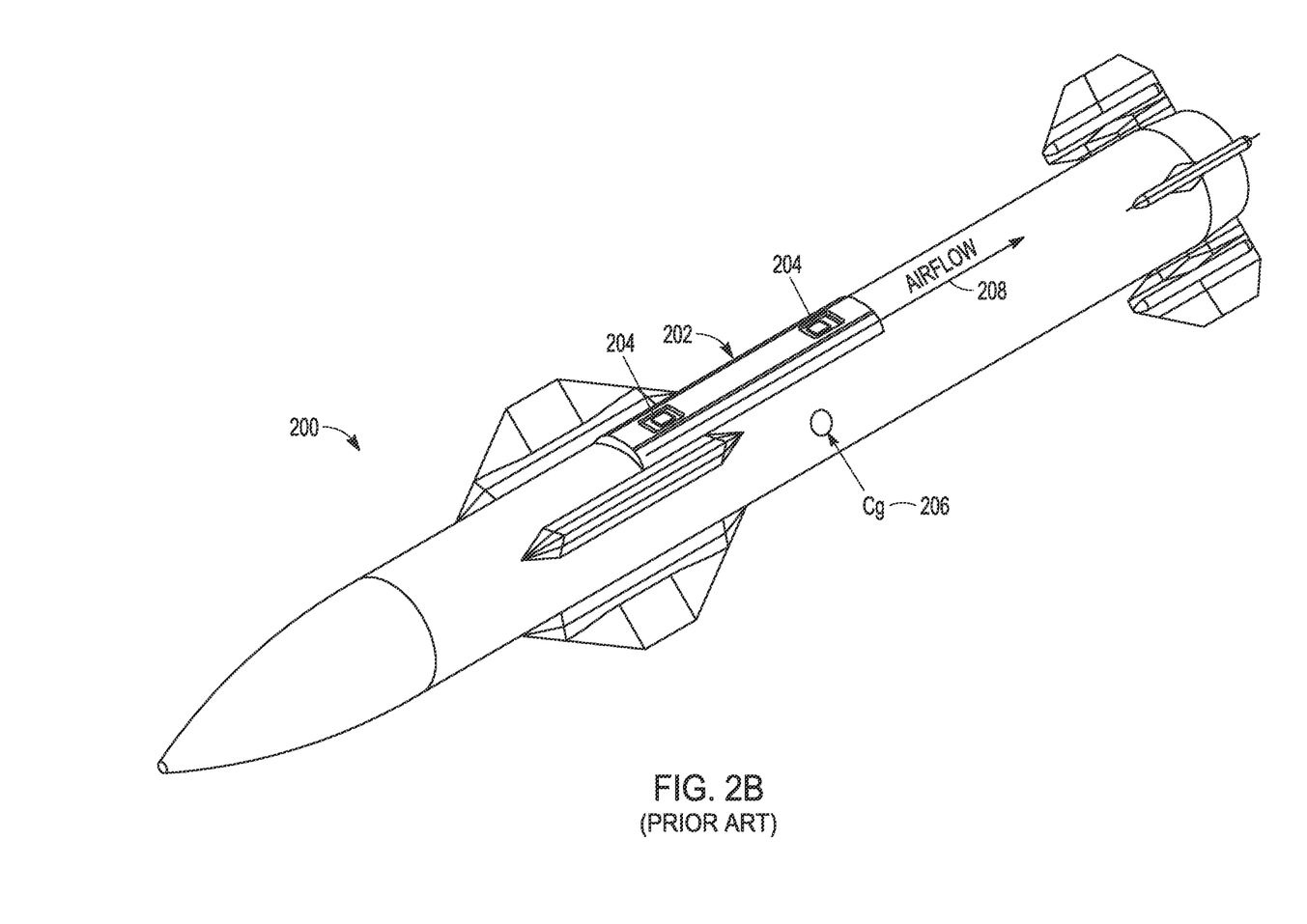

The store-side mechanical interface may, for example, include two protrusions spaced along the longitudinal axis of the store and on opposite sides of the stores longitudinal center-of-gravity (Cg) to engage a complementary attachment feature on the carriage system mechanical interface. The protrusions are typically fixed to the store. Thus when the store is launched from the aircraft the protrusions remain protruding outward from the outer mold line (OML) of the store. Protrusions may include a lug or hooks that are configured to engage a hook or lug on the carriage system or a hangar configured to engage a rail on the the carriage system. As shown in FIG. 1, an expendable aircraft store 100 is provided with fixed lugs 102 fore and aft of the longitudinal Cg 104 of the store. The fixed lugs 102 impede air flow 106 over the store producing an aerodynamic drag penalty while in flight. The store is typically provided with wings 108 generally defined to be lifting surfaces, stability surfaces or control surfaces. Some stores include a "strongback" that flush mounts to the OML of the store. The lugs or hooks fold back into the strongback when the store is released. The strongback adds weight and volume to the store and exhibits an amount of aerodynamic drag. As shown in FIGS. 2A and 2B, an expendable aircraft store 200 is provided with a strongback 202 that supports foldable lugs 204 fore and aft of the longitudinal center of gravity 206 of the store. Upon release, lugs 204 fold into strongback 202. This reduces impedance of air flow 208 over the store to that presented by strong back 202. Folding the lugs or other protrusions inside the OML of the store allows air flow 208 to reduce aerodynamic drag of the store is discouraged as this takes up previous volume inside the store needed for other systems such as propulsion, payloads or guidance.

U.S. Pat. No. 10,538,331 entitled "Retracting Hooks Assembly" discloses a fastening system with a rotatable fastener that may secure an aircraft store to an an aircraft and may rotate to reduce a drag coefficient of the store. The rotatable fastener may require less space and weight compared with the linearly retractable lugs or hooks. The fastening system may include a housing that forms part of the expendable aircraft store, the housing extending along a longitudinal axis, a first fastener rotatably connected to the housing, wherein the first fastener is rotatable about a first fastening axis, and a second fastener rotatably connected to the housing opposite the first fastener relative to the longitudinal axis of the housing, wherein the second fastener is rotatable about a second fastening axis, and wherein the second fastener is rotatable about a portion of the second fastening axis that is laterally offset from the longitudinal axis opposite the first fastening axis, wherein each fastener includes an engagement section for securing the respective fastener to a mechanical interface of the aircraft, each engagement section being radially outward of the respective fastening axis, and wherein each fastener is rotatable from an open position, where the respective engagement section is engageable with the mechanical interface of the aircraft, to a closed position that reduces a drag coefficient of the fastening system compared to the open position.

U.S. Pat. No. 11,332,246 entitled "Container Retention and Release Apparatus for use with Aircraft" discloses an aircraft-side apparatus that includes an actuator, a swaybrace coupled to the actuator, and a clamp pivotally coupled to the swaybrace. The clamp pivots between a clamping position to retain a container and a release position to release a container.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a store-side mechanical interface for securing an expendable aircraft store with fixed or foldable wings to an aircraft in capture carriage and releasing the expendable aircraft store therefrom. The mechanical interface should not add mass, require additional volume or have an aerodynamic drag penalty and must withstand the large forces placed on it during operation of the aircraft. This is accomplished by forming the store-side mechanical interface within the wing base(s) of the store's fixed or foldable wings. During captive carriage, attachment features (e.g., holes or protrusions) formed in the wing base(s) on opposite sides of the store Cg are revealed for mechanical engagement with a complementary attachment feature on the aircraft. Upon release, the attachment features are positioned (e.g., aft of a wing base) or covered (e.g., a portion of the wing moving to cover an attachment feature positioned forward of the wing base) such that the attachment features do not impede air flow over the store.

In different embodiments, the first and second attachment features may be formed fore and aft of a single wing base that spans the stores Cg, of a pair of wing bases at the same longitudinal position that each span the store's Cg or of a pair of wing bases spaced along the longitudinal axis on opposite sides of the store's Cg. Upon release, a portion of the wing moves to cover at least the forward positioned attachment feature. Optionally the wing may also cover the aft positioned attachment feature. A mechanism such as a spring, gears, cables, one shot explosive device or other deployment mechanism may be configured to deploy the portion of the wing to cover the attachment feature.

In an embodiment, the first and second wing bases are spaced along the longitudinal axis on opposite sides of the store Cg. The first and second attachment features are in trailing edges of the first and second wing bases such that upon release do not impede air flow over the store.

In an embodiment, the wings are fixed to the wing bases. Given a forward attachment feature, upon release the deployment mechanism moves a cap to cover the attachment feature.

In another embodiment, the wings are stowed in a folded position in captive carriage to reveal the attachment features. Given a forward attachment feature, upon release a portion of the wing moves with the wing to cover the attachment feature. In one configuration, the wings fold transverse to the longitudinal axis to move a cap to cover the attachment feature. In another configuration, wing sections are stowed end-to-end along the airframe and pivot/translate to join together to form a wing. The attachment features are positioned fore and aft of the end-to-end wing sections in captive carriage. Upon release, the attachment features move inside the OML of the airframe.

These and other features and advantages of the disclosure will be apparent to those skilled in the art from the following detailed description of preferred embodiments, taken together with the accompanying drawings, in which:

DETAILED DESCRIPTION

The present disclosure describes a store-side mechanical interface that includes attachment features formed in a wing base(s) on opposite sides of a store Cg for securing an expendable aircraft store with fixed or foldable wings to an aircraft in capture carriage and releasing the expendable aircraft store therefrom. The mechanical interface does not not add mass, require additional volume or have an aerodynamic drag penalty and can withstand the large forces placed on it during operation of the aircraft. During captive carriage, the attachment features formed in the wing base are revealed for mechanical engagement with a complementary attachment feature on the aircraft. Upon release, the attachment features are either positioned aft of a wing base or covered by movement of a portion of a wing such that the first and second attachment features do not impede air flow over the store.

Referring now to FIGS. 3A-3C, 4A-4B, 5A-5C and 6A-6C, an embodiment of a mechanical interface 300 secures a fixed-wing expendable aircraft store 302 having a longitudinal center-of-gravity (Cg) 306 to an aircraft in captive carriage and then ejects and releases the expendable aircraft store therefrom for guided flight. An airframe 308 that extends along a longitudinal axis 310 is configured to form part of the expendable aircraft store 302. Wing bases 312 are spaced at 90° around the circumference of the airframe at the same longitudinal position that straddle store Cg 306 and extend outside the outer mold line (OML) of the airframe. Wings 314 are rigidly fixed to the wing bases 312. In other stores, the number of wings and the spacing between the wings may be different.

A store-side assembly of the mechanical interface 300 includes attachment features 316 (e.g., round or square holes or a lug) on leading and trailing surfaces 318 and 320, respectively fore and aft of the two wing bases 312 held adjacent the aircraft in captive carriage. Deployment mechanisms 322 such as a spring, gears, cables or a one-shot explosive device are configured to move caps 324 to cover attachment features 316 and form leading and trailing portions 326 and 328 of wings 314.

An aircraft-side assembly of the mechanical interface 300, also referred to as the carriage-system 350, includes weapon engagement devices 352 positioned to engage attachment features 316. These devices may be pins that move parallel axis to engage and disengage the attachment features. The carriage-system may also include an ejector/sway brace 354 configured to engage the top of the store.

Figure 5A:
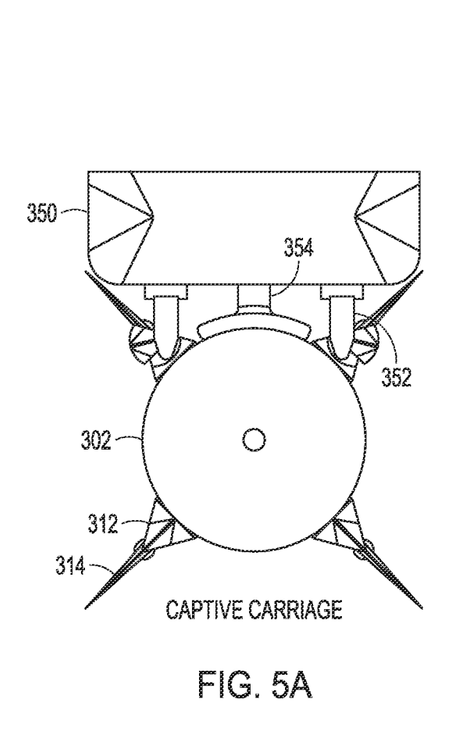
FIGS. 5A-5C and 6A-6C are end-on and side views of the expendable aircraft store illustrating captive carriage, ejection and release of the store.
Figure 6A:
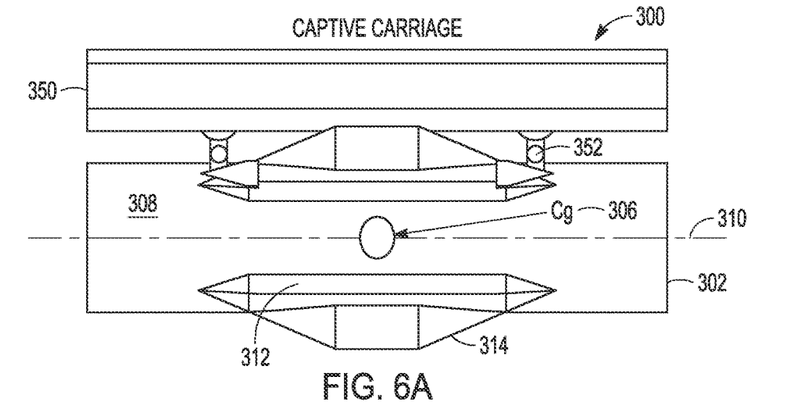

During captive carriage, the wings 314 reveal attachment features 316 for mechanical engagement with the weapon engagement devices 352 fore and aft of the wing bases 312 to securely hold store 302. Ejector/sway brace 354 reduces movement of the store.

Figure 5B:
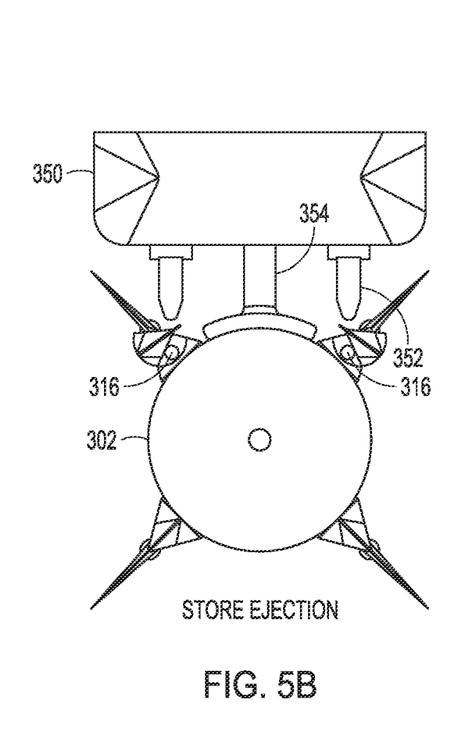
Figure 6B:
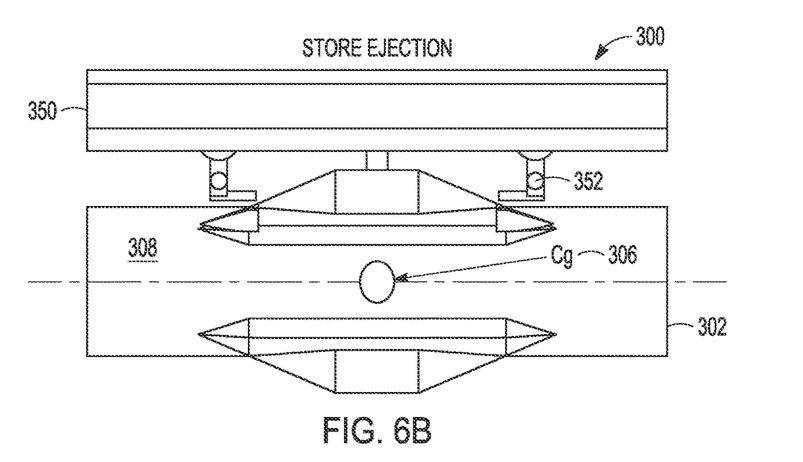

At store ejection, the weapon engagement devices 352 are disengaged from the attachment features 316 fore and aft of the wing bases 312 to allow store 302 to drop away from the aircraft. Ejector/sway brace 354 may be used to push on the airframe to move the store away from the aircraft.

Figure 5C:
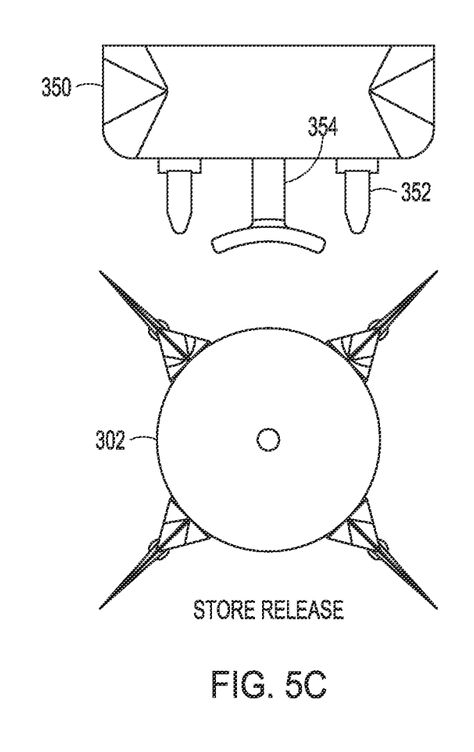
Figure 6C:
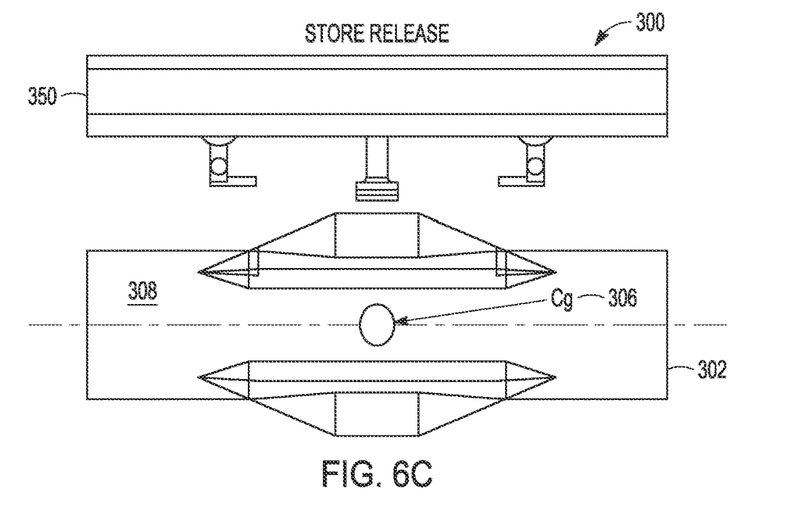

At store release, the store 302 has been fully-ejected from carriage-system 350 and the deployment mechanisms 322 activated to move caps 324 to cover the attachment features such that the store is ready to begin its free guided flight.

Figure 3A:
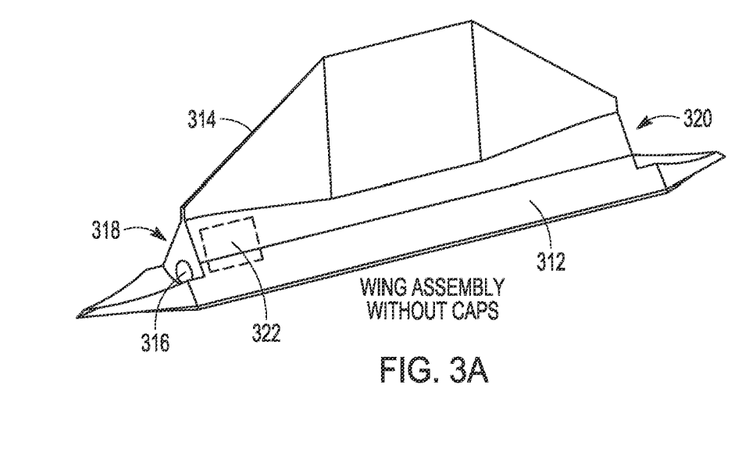
FIGS. 3A-3C are views of a fixed wing assembly with attachment features formed fore and aft on opposite sides of the store's Cg.
Figure 3B:
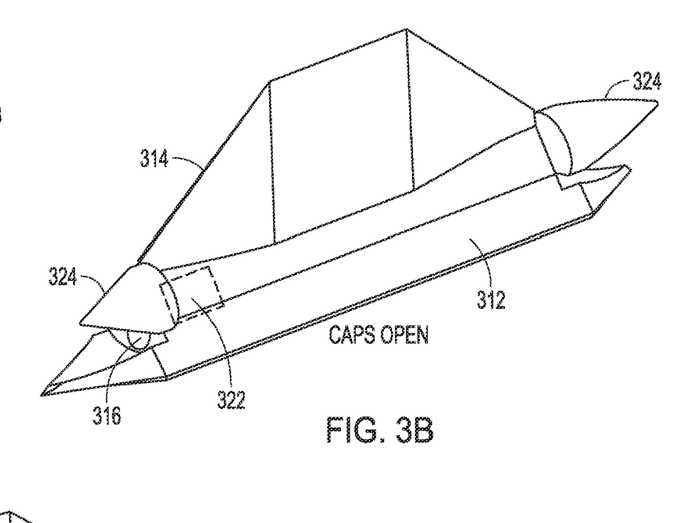
Figure 3C:
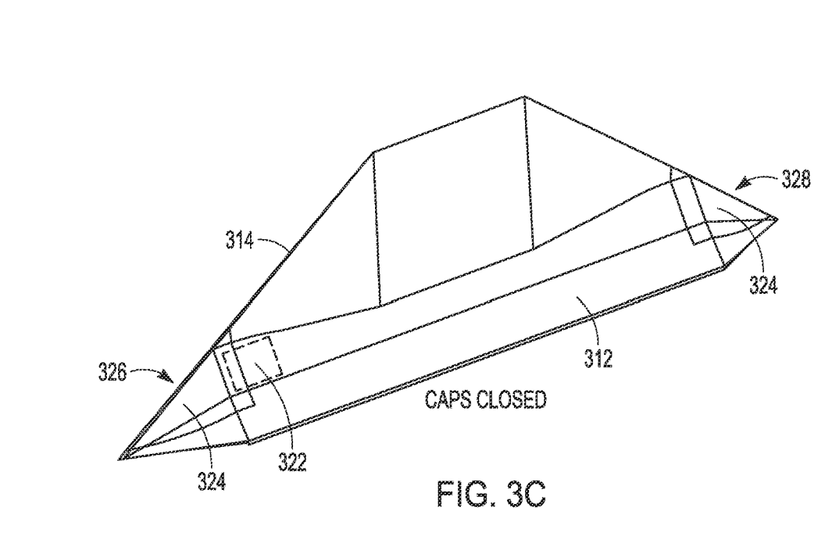
Figure 4A:
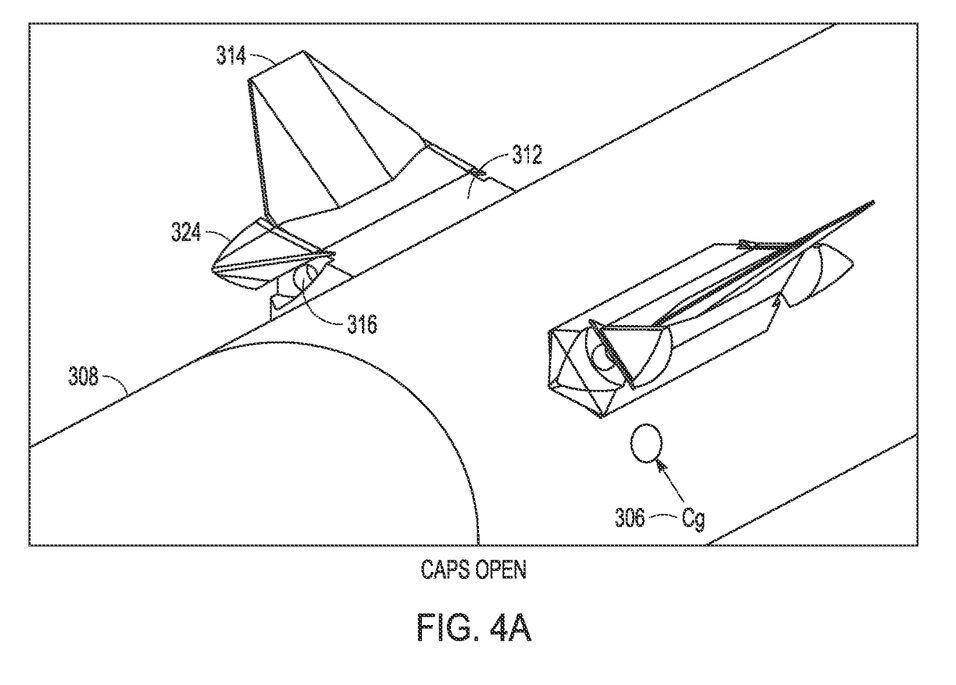
FIGS. 4A-4B are isometric views showing a movable cap positioned forward on the fixed wing assembly to reveal the attachment feature for capture carriage and to cover the attachment feature upon release.
Figure 4B:
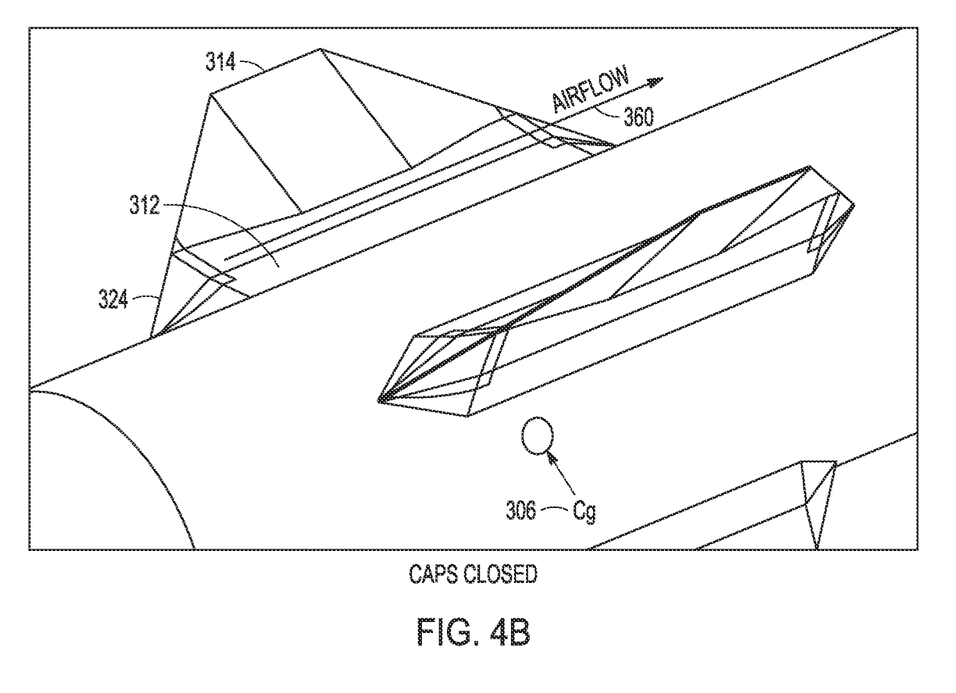

In this embodiment, caps 324 have been provided to cover the attachment features 316 fore and aft of the wing bases 312. Generally speaking, the caps are only required for the forward positioned attachment features that would otherwise impede airflow 360. The attachment features 316 positioned at the trailing edge of the wing bases 312 do not impede airflow.

In many aircraft expendable stores, the store Cg is not spanned by a single wing configuration but rather lies between forward and rear wing configurations. In these stores, the attachment features are placed on the forward and rear wing configurations to span the store Cg.

Figure 7:
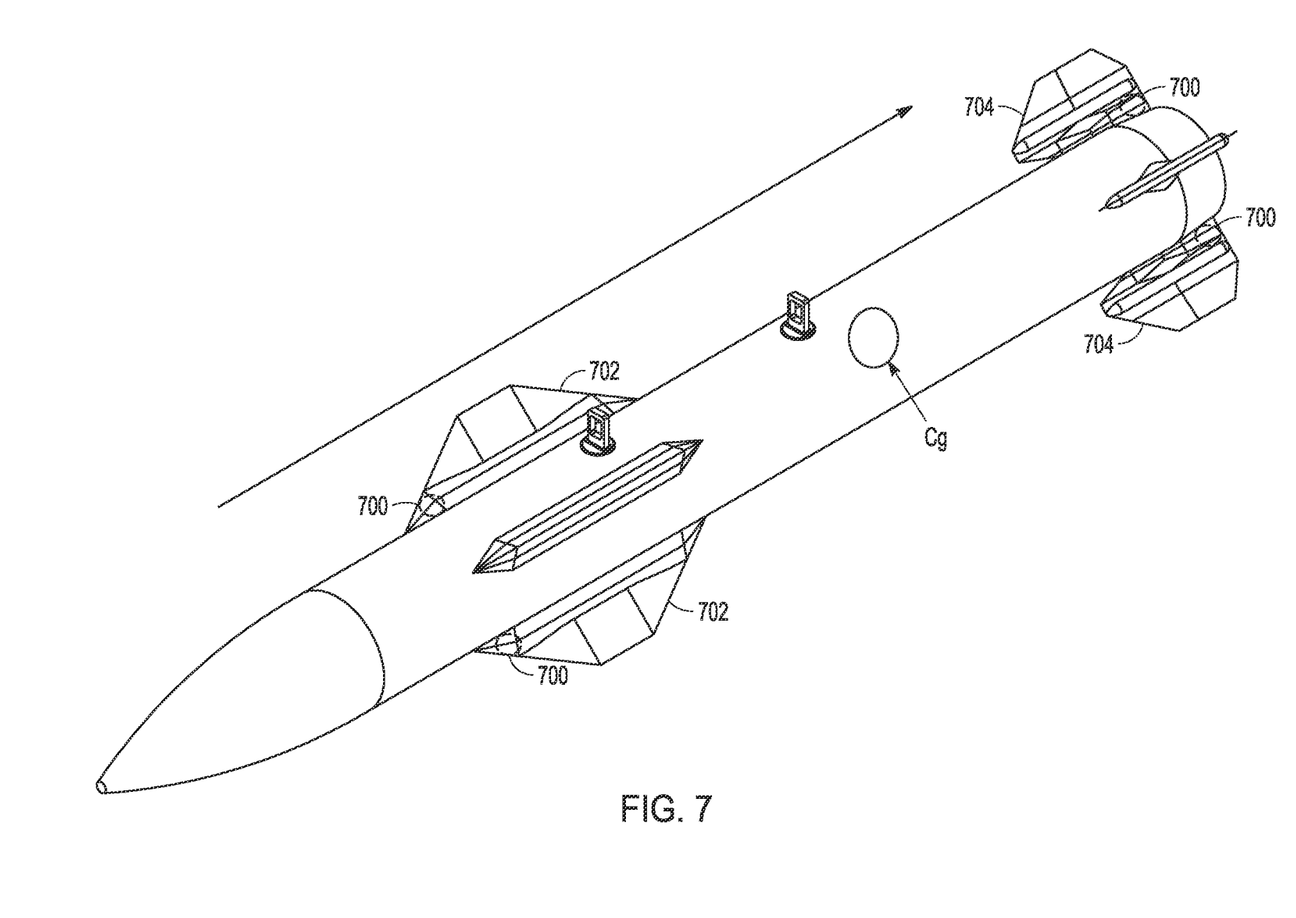
FIG. 7 is an isometric view of attachment features formed fore and aft on different wings positioned on opposite sides of the store's Cg.

Referring now to FIG. 7, in an embodiment attachment features 700 are positioned forward on leading surfaces of wing bases 702 in a forward wing configuration and positioned aft on trailing surfaces of wing bases 704 in a rear wing configuration. Alternately, the attachment features 700 could be positioned aft on trailing surfaces of wing bases 702 in the forward wing configuration and positioned forward on the leading surfaces of wing bases 704 in the rear wing configuration. In either configuration, the weapon engagement devices produce forces in opposing axial directions to secure the store.

Figure 8:
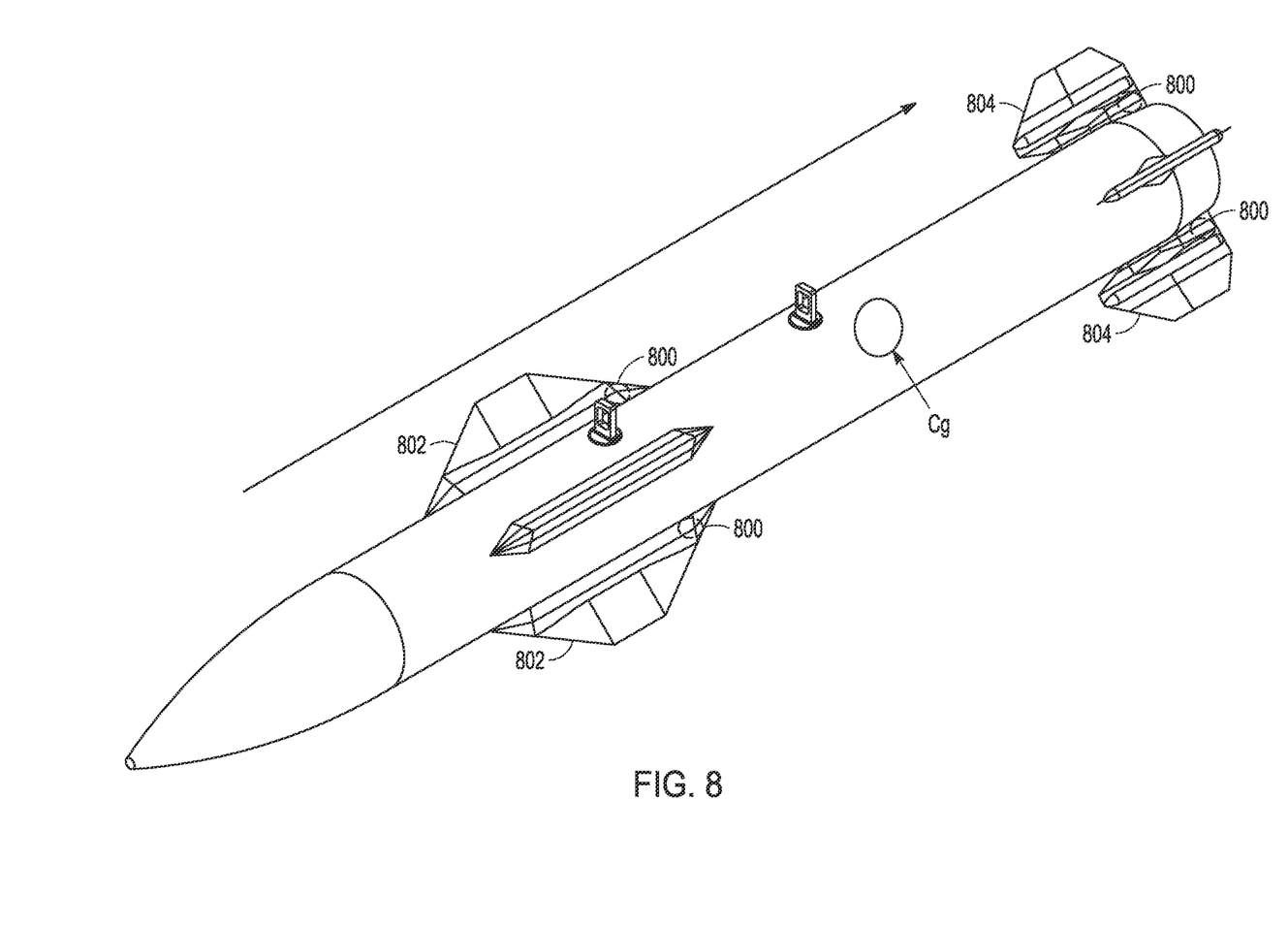
FIG. 8 is an isometric view of attachment features aft of different wings positioned on opposite sides of the store's Cg.

Referring now to FIG. 8, in an embodiment attachment features 800 are positioned aft on trailing surfaces of wing bases 802 in a forward wing configuration and positioned aft on trailing surfaces of wing bases 804 in a rear wing configuration. This configuration has the advantage that all attachment features are positioned aft of wing bases and thus do not impede airflow and thus do not require caps. Alternately, the attachment features 800 could be positioned forward on leading surfaces of wing bases 802 in the forward wing configuration and positioned forward on the leading surfaces of wing bases 804 in the rear wing configuration. In this configuration, all of the attachment features would require caps so as not to impede airflow. In either configuration, the weapon engagement devices produce forces in the same axial direction. As such, the attachment features and weapon engagement devices may require modification to adequately secure the store.

In many aircraft expendable stores, the wings are foldable to a stowed position for capture carriage. As described above, the attachment features are positioned on the wing bases fore or aft. For forward positioned attachment features, when the wings are folded to the stowed position for capture carriage the attachment features are revealed for mechanical engagement with the weapon engagement devices. Once released, the wings move to their deployed position with a portion of the wing moving to cover the forward positioned attachment feature. For example, the wing may include a cap that moves with the wing to cover the attachment feature. Alternately, the portion of the wing may move the attachment feature so that it is now covered.

Figure 9A:
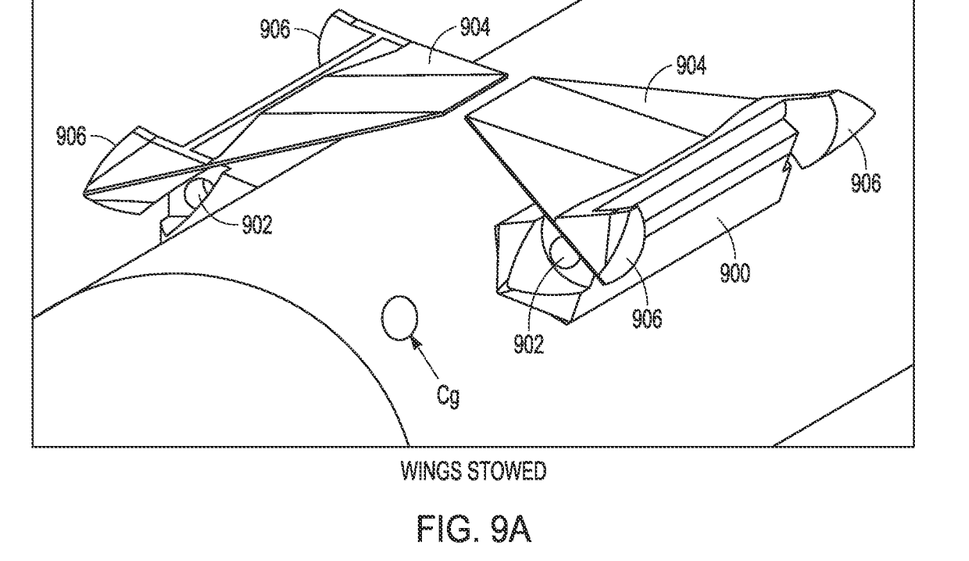
FIGS. 9A-9B are isometric views of foldable wings in capture carriage to reveal the attachment features formed fore and aft and upon release to cover the attachment features upon release.
Figure 9B:
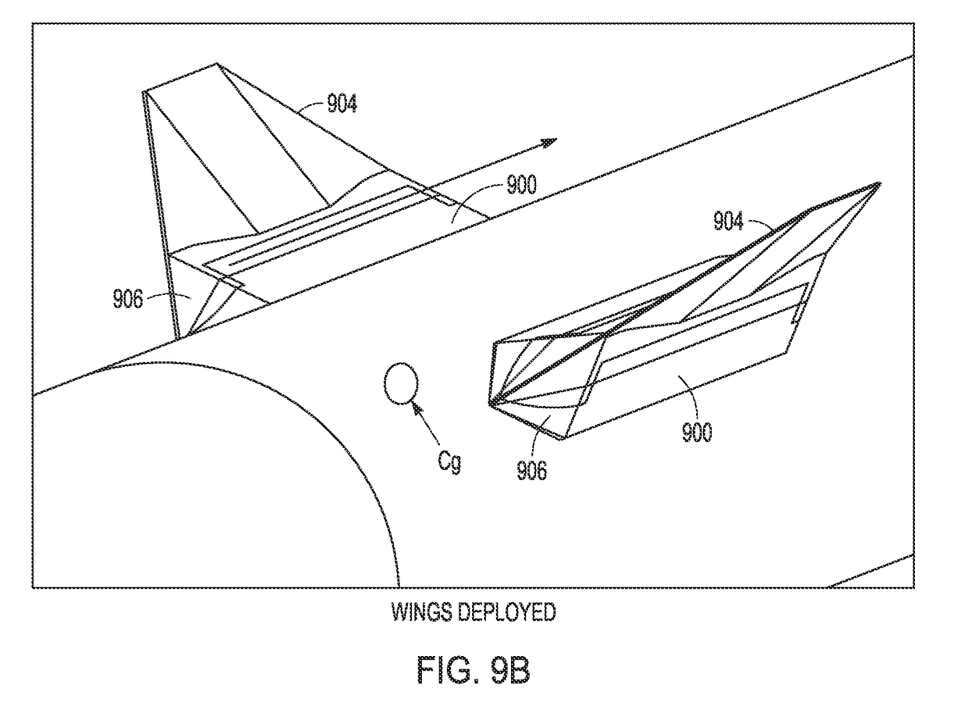

Referring now to FIGS. 9A-9B, in a folded-wing embodiment wing bases 900 are positioned parallel to the longitudinal axis at the same longitudinal position and span store Cg. Attachment features 902 are formed fore and aft of the wing bases 900. Foldable wings 904 are rotatably coupled to the wing bases 900 to move between stowed positions transverse to the longitudinal axis and deployed positions. Caps 906 are attached fore and aft to the foldable wings 904 such that when stowed the attachment features 902 are revealed and when deployed the attachment features 902 are covered. Again, the aft positioned caps are optional.

Figures 10A, 10B:
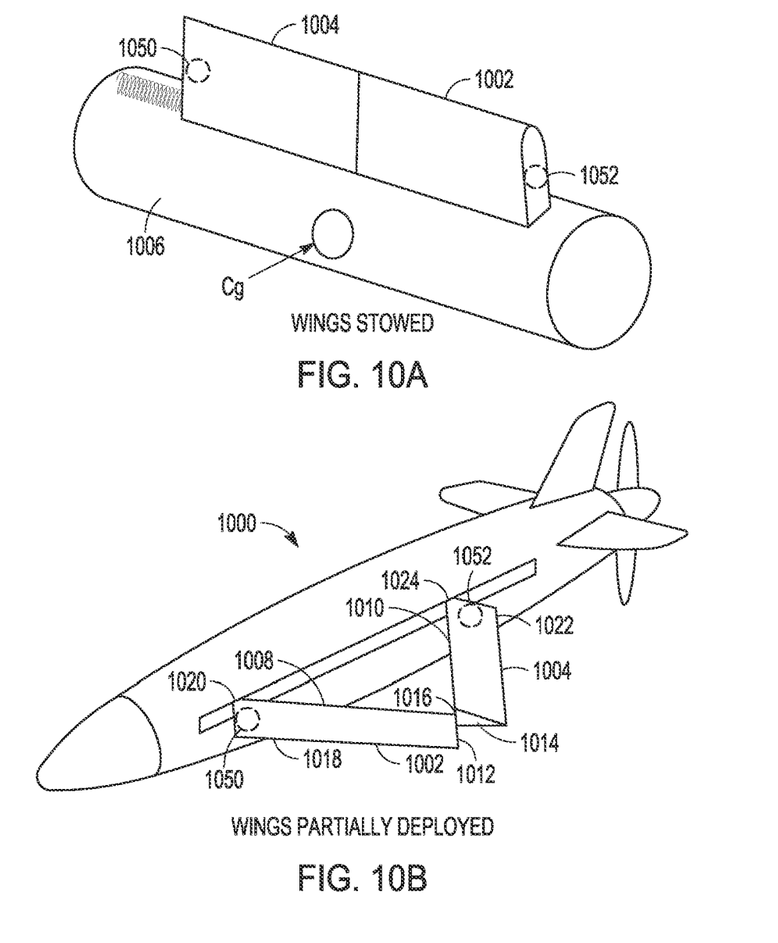
FIGS. 10A-10C are isometric views of an alternative foldable wing structure provided with attachment features during capture carriage, partial and full deployment.
Figure 10C:
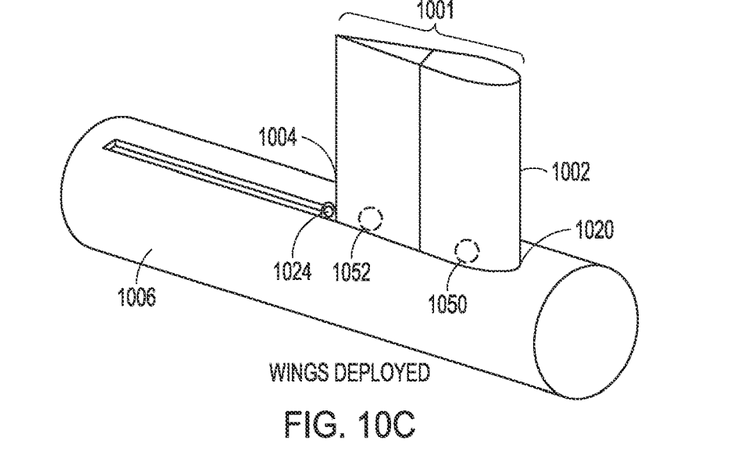

Referring now to FIGS. 10A-10B, a folded-wing design disclosed in U.S. Pat. No. 10,429,159 for airborne bodies is adapted in accordance with the present invention to provide a mechanical interface for an expendable aircraft store 1000. Each wing 1001 includes first and second rigid airfoil sections 1002 and 1004 stowed end-to-end along an airframe 1006. The airfoil sections have first and second interior edges 1008 and 1010 of equal lengths. Abutting ends 1012 and 1014 are connected at the first and second interior edges by a floating pivot 1016. A distant end 1018 of the first rigid airfoil section is coupled to a fixed pivot 1020 on the airframe. A distant end 1022 of the second rigid airfoil section has a translation point 1024. The first and second rigid air foil sections are configured to rotate in opposite directions to move the translation point 1024 axially along the airframe to abut the fixed pivot 1020 driving the floating pivot 1016 radially away from the airframe to join the first and second interior edges in a deployed position transverse to the airframe to form the wing 1001. A forward surface at the distant end 1018 of the first rigid airfoil section 1002 provides a first wing base where a first attachment feature 1050 is positioned. A trailing surface at the distant end 1022 of the first rigid airfoil section 1004 provides a first wing base where a second attachment feature 1052 is positioned. During captive carriage, the first and second rigid airfoil sections are stowed end-to-end. The carriage system's store engagement devices are positioned to engage the attachment features at opposite ends of this end-to-end configuration. Upon release, the distant ends of the first and second rigid airfoil sections move inside the OML of the airframe to cover the first and second attachment features 1050 and 1052.

The mechanical interface may be adapted to many different folded-wing designs. The attachment features are positioned in wing bases attached to or formed with a portion of the wing. During captive carriage, the attachment features are revealed for mechanical engagement with aircraft-side store engagement devices. Once released, the attachment features are either positioned aft of the wing base/wings where they do not impede air flow or a portion of the wing moves to cover the attachment features so that they do not impede air flow.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

I claim:

1. A mechanical interface for securing an expendable aircraft store to an aircraft having a longitudinal center-of-gravity (Cg) in captive carriage and releasing the expendable aircraft store therefrom, including:
   an airframe that is configured to form part of the expendable aircraft store, the airframe extending along a longitudinal axis;
   first and second wing bases that extend outside the outer mold line (OML) of the airframe;
   first and second wings coupled to the first and second wing bases, respectively;
   first and second attachment features in the first or second wing bases on opposite sides of the store Cg, during captive carriage said first or second wings revealing the first and second attachment features for mechanical engagement with a complementary pair of attachment features on the aircraft, upon release of the attachment features and expendable aircraft store said first and second attachment features being positioned or covered such that the first and second attachment features do not impede air flow over the store.

2. The mechanical interface of claim 1, wherein the first and second attachment features include holes or protrusions in the first or second wing bases.

3. The mechanical interface of claim 1, wherein the first attachment feature is in a leading edge of the first wing base, upon release a portion of the first wing configured to move to cover the first attachment feature.

4. The mechanical interface of claim 3, wherein the first and second wings are fixed to the first and second wing bases, respectively, in a deployed position, wherein the portion of the first wing includes a cap that moves to cover the first attachment feature upon release.

5. The mechanical interface of claim 4, further comprising a mechanism configured to move the cap to cover the first attachment feature upon release.

6. The mechanical interface of claim 3, wherein the first and second wings fold to a stowed position during captive carriage, wherein the portion of the first wing moves with the first wing as it deploys upon release to cover the first attachment feature.

7. The mechanical interface of claim 6, wherein the first and second wing bases lie parallel to the longitudinal axis, wherein the first and second wings fold transverse to the longitudinal axis to move a cap to cover the first attachment feature.

8. The mechanical interface of claim 6, wherein the first wing includes first and second rigid airfoil sections stowed end-to-end along the airframe, which have first and second interior edges of equal lengths, abutting ends connected at the first and second interior edges by a floating pivot, a distant end of the first rigid airfoil section coupled to a fixed pivot on the airframe, and a distant end of the second rigid airfoil section having a translation point, said first and second rigid air foil sections configured to rotate in opposite directions to move the translation point axially along the airframe to abut the fixed pivot driving the floating pivot radially away from the airframe to join the first and second interior edges in a deployed position transverse to the airframe to form the first wing, wherein said first wing base and first attachment feature are a forward surface at the distant end the first rigid airfoil section and said second wing base and second attachment feature are at an aft surface at the distant end of the second rigid airfoil, upon release the distant ends of the first and second rigid airfoil sections move inside the OML of the airframe to cover the first and second attachment features.

9. The mechanical interface of claim 3, wherein the second attachment feature is in a trailing edge of the first or second wing base positioned not to impede the air flow.

10. The mechanical interface of claim 9, wherein the second attachment feature is in the trailing edge of the first wing base, wherein the store Cg lies between the leading and trailing edges of the first wing base.

11. The mechanical interface of claim 9, wherein the second attachment feature is in the trailing edge of the second wing base, wherein the store Cg lies between the leading and the trailing edges.

12. The mechanical interface of claim 9, wherein the second attachment feature is in the trailing edge of the second wing base, wherein the store Cg lies between the first and second wing bases.

13. The mechanical interface of claim 1, wherein the first and second attachment features are in trailing edges of the first and second wing bases spaced along the longitudinal axis, wherein the store Cg lies between the first and second wing bases, wherein the first and second attachment features are both positioned aft of the first and second wing bases such that upon release do not impede air flow over the store.

14. A mechanical interface for securing an expendable aircraft store to an aircraft having a longitudinal center-of-gravity (Cg) in captive carriage and releasing the expendable aircraft store therefrom, including:
　an airframe that is configured to form part of the expendable aircraft store, the airframe extending along a longitudinal axis;
　first and second wing bases that extend outside the outer mold line (OML) of the airframe, said first wing base having a leading edge;
　first and second wings attached to the first and second wing bases, respectively;
　a first attachment feature formed on the leading edge of the first wing base;
　a second attachment feature formed on the first or second wing base such that said first and second attachment features are on opposite sides of the Cg;
　first and second attachment feature formed in the first or second wing bases on opposite sides of the store Cg, during captive carriage said first and second wings revealing the first and second attachment features for mechanical engagement with a complementary pair of attachment features on the aircraft, upon release of the attachment features and expendable aircraft store, a portion of the first wing configured to move to cover the first attachment feature so that the neither said first or second attachment features impede air flow over the store.

\* \* \* \* \*